United States Patent
An et al.

(10) Patent No.: US 10,165,252 B2
(45) Date of Patent: Dec. 25, 2018

(54) METHOD OF SUB-PREDICTION UNIT INTER-VIEW MOTION PREDICTION IN 3D VIDEO CODING

(71) Applicant: HFI INNOVATION INC., Zhubei, Hsinchu County (TW)

(72) Inventors: Jicheng An, Beijing (CN); Kai Zhang, Beijing (CN); Jian-Liang Lin, Su'ao Township, Yilan County (TW)

(73) Assignee: HFI Innovation Inc., Zhubei, Hsinchu County (TW)

( * ) Notice: Subject to any disclaimer, the term of this patent is extended or adjusted under 35 U.S.C. 154(b) by 22 days.

(21) Appl. No.: 14/891,822

(22) PCT Filed: Jul. 10, 2014

(86) PCT No.: PCT/CN2014/081931
§ 371 (c)(1),
(2) Date: Nov. 17, 2015

(87) PCT Pub. No.: WO2015/003635
PCT Pub. Date: Jan. 15, 2015

(65) Prior Publication Data
US 2016/0134857 A1    May 12, 2016

(30) Foreign Application Priority Data
Jul. 12, 2013 (WO) ............... PCT/CN2013/079287

(51) Int. Cl.
*H04N 13/00* (2018.01)
*H04N 19/139* (2014.01)
(Continued)

(52) U.S. Cl.
CPC ......... *H04N 13/161* (2018.05); *H04N 19/176* (2014.11); *H04N 19/44* (2014.11);
(Continued)

(58) Field of Classification Search
CPC .. H04N 13/0048; H04N 19/176; H04N 19/52; H04N 19/44; H04N 19/139
(Continued)

(56) References Cited

U.S. PATENT DOCUMENTS

2012/0229602 A1  9/2012  Chen et al.
2012/0288004 A1  11/2012  Sato
(Continued)

FOREIGN PATENT DOCUMENTS

CN    101222639    7/2008
CN    102696227    9/2012
(Continued)

OTHER PUBLICATIONS

International Search Report dated Oct. 14, 2014, issued in application No. PCT/CN2014/081931.
(Continued)

*Primary Examiner* — On S Mung
(74) *Attorney, Agent, or Firm* — Oblon, McClelland, Maier & Neustadt, L.L.P.

(57) ABSTRACT

A method for a three-dimensional encoding or decoding system incorporating sub-block based inter-view motion prediction is disclosed. The system utilizes motion or disparity parameters associated with reference sub-blocks in a reference picture of a reference view corresponding to the texture sub-PUs split from a current texture PU (prediction unit) to predict the motion or disparity parameters of the current texture PU. Candidate motion or disparity parameters for the current texture PU may comprise candidate motion or disparity parameters derived for all texture sub-PUs from splitting the current texture PU. The candidate motion or disparity parameters for the current texture PU can be used as a sub-block-based inter-view Merge candidate for the current texture PU in Merge mode. The sub-
(Continued)

V0 (reference view)    V1 (current view)

block-based inter-view Merge candidate can be inserted into a first position of a candidate list.

20 Claims, 2 Drawing Sheets

(51) Int. Cl.
*H04N 19/44* (2014.01)
*H04N 19/176* (2014.01)
*H04N 19/52* (2014.01)
*H04N 13/161* (2018.01)
*H04N 19/597* (2014.01)

(52) U.S. Cl.
CPC .......... *H04N 19/52* (2014.11); *H04N 19/597* (2014.11); *H04N 19/139* (2014.11)

(58) Field of Classification Search
USPC .......................... 375/240.01, 240.12, 240.16
See application file for complete search history.

(56) References Cited

U.S. PATENT DOCUMENTS

| | | | | |
|---|---|---|---|---|
| 2013/0242046 A1* | 9/2013 | Zhang | ................ | H04N 13/0048 348/43 |
| 2014/0341291 A1* | 11/2014 | Schwarz | .............. | H04N 19/597 375/240.16 |

FOREIGN PATENT DOCUMENTS

| | | |
|---|---|---|
| CN | 102790892 | 11/2012 |
| KR | 10-2010-0056757 | 5/2010 |
| WO | WO 2013/030456 | 3/2013 |
| WO | WO 2013/053309 | 4/2013 |
| WO | WO 2013/068548 | 5/2013 |

OTHER PUBLICATIONS

Sullivan, G.J., et al.; "Overview of the High Efficiency Video Coding;" IEEE Transactions on Circuits and Systems for Video Technology; vol. 22; No. 12; Dec. 2012; pp. 1649-1668.

An, J., et al.; "3D-CE2.h related: Inter-view scaling for DV derivation;" Joint Collaborative Team on 3D Video Coding Extension Development of ITU-T SG 16 WP 3 and ISO/IEC JTC 1/SC 29/WG 11; Apr. 2013; pp. 1-4.

"Competition based motion vector prediction—new results;" Telecommunication Standardization Sector; Study Group 16-Contribution 79; Nov. 2006; pp. 1-8.

* cited by examiner

METHOD OF SUB-PREDICTION UNIT INTER-VIEW MOTION PREDICTION IN 3D VIDEO CODING

CROSS REFERENCE TO RELATED APPLICATIONS

The present invention is a National Phase Application of PCT Application No. PCT/CN2014/081931, filed on Jul. 10, 2014, claims priority to PCT Patent Application, Serial No. PCT/CN2013/079287, filed on Jul. 12, 2013, entitled "Methods for Inter-view Motion Prediction". The PCT Patent Application is hereby incorporated by reference in its entirety.

FIELD OF THE INVENTION

The present invention relates to three-dimensional video coding. In particular, the present invention relates to sub-PU (prediction unit) based prediction associated with inter-view motion prediction (IVMP) for a texture PU in a three-dimensional (3D) coding system.

BACKGROUND AND RELATED ART

Three-dimensional (3D) television has been a technology trend in recent years that intends to bring viewers sensational viewing experience. Various technologies have been developed to enable 3D viewing and the multi-view video is a key technology for 3DTV application among others. To exploit the inter-view redundancy, 3D coding tools such as inter-view motion prediction (IVMP) have been integrated to conventional 3D-HEVC (High Efficiency Video Coding) or 3D-AVC (Advanced Video Coding) codec.

FIG. 1 illustrates the basic concept of the IVMP in current 3DV-HTM. For deriving the motion parameters of temporal inter-view Merge candidate (TIVMC) for a current Prediction Unit (PU, 110) in a dependent view, a disparity vector (DV) can be derived to locate a reference block (120) in a reference view. The derived DV can be based on the neighboring block disparity vector (NBDV) or the depth-oriented NBDV (DoNBDV) for the current prediction unit (PU). By adding the derived DV (130) to the middle position of the current PU (110), a reference sample location (120) is obtained. The prediction block in the already coded picture in the reference view covering the sample location is used as a reference block. If this reference block is coded using motion compensated prediction (MCP), the associated motion parameters can be used as the TIVMC for the current PU in the current view. The derived DV can also be directly used as the disparity inter-view Merge candidate (DIVMC) for disparity compensated prediction (DCP) of the current PU.

The corresponding area in a reference view may have plentiful motion information. However, according to the existing coding practice, only the motion information in the middle position of the area in the reference view is used for current PU in a dependent view. Therefore, it is desirable to develop an improved coding method that can further utilize the motion information of the reference block in the reference view.

BRIEF SUMMARY OF THE INVENTION

A method for a three-dimensional encoding or decoding system incorporating sub-block based inter-view motion prediction is disclosed. Embodiments of the present invention utilize motion or disparity parameters associated with reference sub-blocks in a reference picture of a reference view corresponding to the texture sub-PUs split from a current texture PU (prediction unit) to predict the motion or disparity parameters of the current texture PU. The location of each reference sub-block can be determined by adding a derived DV (disparity vector) to a specific location of each texture sub-PU. An individual DV (disparity vector) or a unified derived DV can be used to locate each reference sub-block corresponding to each texture sub-PU. The unified derived DV can be signaled explicitly to a decoder or can be derived implicitly by the decoder. The unified derived DV can be selected from a plurality of DV candidates and DV selection information can be signaled explicitly to a decoder or can be derived implicitly by the decoder.

A texture sub-PU may share the motion or disparity parameters of a neighboring sub-PU when the motion or disparity parameters of the reference sub-block corresponding to the texture sub-PU are not available. A texture sub-PU may use default motion or disparity parameters when the motion or disparity parameters of the reference sub-block corresponding to the texture sub-PU are not available. When the motion or disparity parameters of a reference sub-block correspond to a temporal direction, the motion or disparity parameters of the reference sub-block can be used as candidate motion parameters in the temporal direction for the texture sub-PU corresponding to the reference sub-block. Otherwise, when the motion or disparity parameters of the reference sub-block correspond to an inter-view direction, the motion or disparity parameters of the reference sub-block can be used as the candidate motion parameters in the inter-view direction for the texture sub-PU corresponding to the reference sub-block. When the motion or disparity parameters of a reference sub-block correspond to a temporal direction, the texture sub-PU corresponding to the reference sub-block can be assigned a same motion vector and POC (Picture Order Count) of the reference sub-block. When the reference picture is in an inter-view direction, a motion vector or disparity vector of a reference sub-block is scaled to generate the motion vector of the texture sub-PU corresponding to the reference sub-block. A motion vector of a reference sub-block can be scaled to generate the motion vector of the texture sub-PU corresponding to the reference sub-block when POC (Picture Order Count) of the reference sub-block is different from the POC of the reference picture for the sub-PU.

According to one embodiment of the present invention, candidate motion or disparity parameters for the current texture PU comprise one or more candidate motion or disparity parameters derived for at least one texture sub-PU from splitting the current texture PU. The candidate motion or disparity parameters for the current texture PU can be used as a sub-block-based inter-view Merge candidate for the current texture PU in Merge mode. The sub-block-based inter-view Merge candidate can be inserted into a first position of a candidate list. The current texture PU may have more than one sub-block-based inter-view Merge candidates corresponding to different sub-PU sizes, and each sub-PU size includes one or more block sizes smaller than or equal to a PU size.

The texture sub-PU size can be selected from a group consisting of 4×4, 8×8, 16×16 and current texture PU size. The current texture PU will not be further divided when the texture sub-PU size is larger than or equal to the current texture PU size. A flag can be signaled to indicate the texture sub-PU size, a partition level of texture sub-PU partition, a quadtree/split depth for the texture sub-PU partition, or whether the current texture PU is divided into the texture sub-PUs. The flag may be explicitly transmitted in a sequence level, view level, picture level, or slice level of a bitstream, such as in SPS (sequence parameter set), PPS (picture parameter set), VPS (video parameter set), APS (adaptation parameter set), or slice header, or the flag is implicitly derived on decoder side.

DETAILED DESCRIPTION OF THE INVENTION

Figure 1:
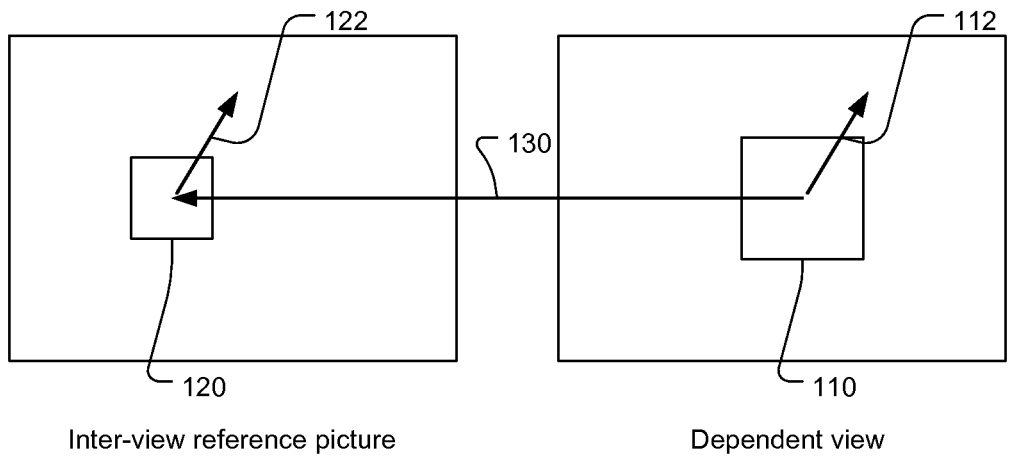
FIG. 1 illustrates an example of inter-view motion prediction (IVMP) for prediction of motion or disparity parameters of a current block in three-dimensional video coding according to existing 3D-HEVC (three dimensional video coding based on High Efficiency Video Coding).
Figure 2:
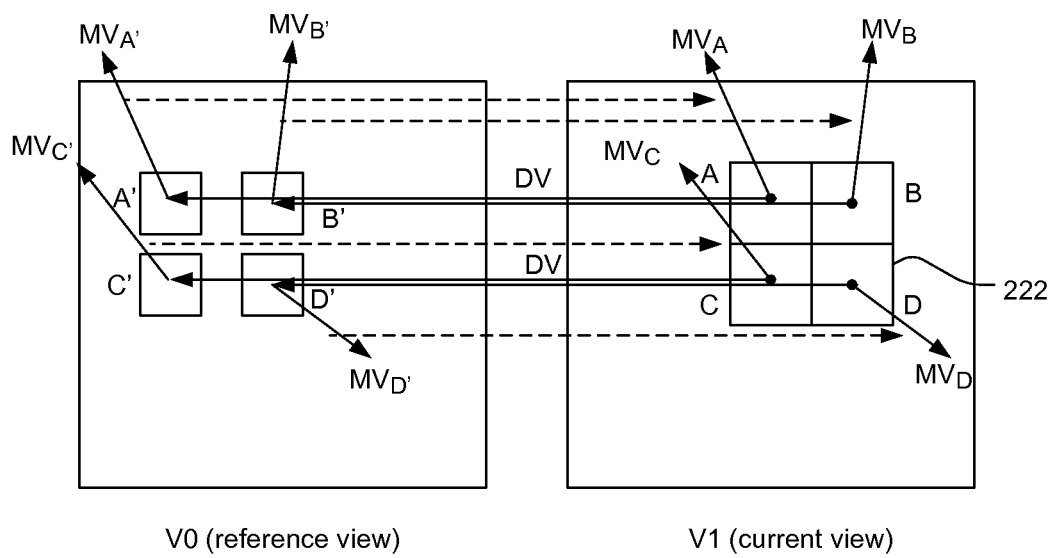
FIG. 2 illustrates an example of sub-PU (prediction unit) based inter-view motion prediction (IVMP) for prediction of motion or disparity parameters of a current block in three-dimensional video coding according to an embodiment of the present invention.

As mentioned above, the existing coding practice only uses the motion information in the middle position of the area in the reference view for the current PU in a dependent view. This practice does not efficiently use the motion information associated with the reference. Therefore, embodiments of the present invention use sub-PU level inter-view motion prediction (SPIVMP) to obtain refined motion information for the current PU. FIG. 2 illustrates an example of SPIVMP according to an embodiment of the present invention. A current PU (222) in a current dependent view (i.e., V1) is divided into multiple sub-PUs, (i.e., A, B, C and D), where each sub-PU has a smaller size. The disparity vector (DV) associated with each sub-PU is added to the respective position (as illustrated by a dot in the center of each sub-PU) to locate a respective prediction block (i.e., A', B', C' or D') in the reference view (i.e., V0), where the prediction blocks (i.e., A', B', C' and D') in the reference view are already coded. The prediction blocks covering the sample positions are used as reference blocks. The DV used to derive a reference block in a reference view for each sub-PU can be a derived DV and the derived DV can be different for each sub-PU or all sub-PUs can share a unified derived DV.

The temporal inter-view Merge candidate (TIVMC) of a current Prediction Unit (PU) can be derived according to the SPIVMP as shown below.
 1. First, divide the current PU into multiple sub-PUs having smaller size.
 2. Second, add a derived DV to a specific position (for example, the middle position) of each sub-PU to obtain a group of reference sample locations. For each reference sample location, a prediction sub-block in the already coded picture in the reference view that covers that sample position is used as a reference sub-block. A reference sub-block in a reference view is usually derived for each sub-PU according to a derived DV. The derived DV can be different for each sub-PU or all sub-PUs can share a unified derived DV.
 3. Third, for each reference sub-block, if it is coded using MCP, the associated motion parameters can be used as TIVMC for the corresponding sub-PU in the current PU in the current view. Otherwise, the corresponding sub-PU can share the candidate motion parameters with its spatial neighboring sub-PU.

Finally, the TIVMC of the current PU is composed of the TIVMCs of all the sub-PUs.

The following pseudo code illustrates an example of the above third step in details. In this example, the current PU is partitioned into N sub-PUs. The process is shown as follows.
 tempMP is set equal to null.
 For each sub-PU denoted as SPi in the current PU, where i=0,. . .,N−1:
  The candidate motion parameters of SPi denoted as CMP(SPi) is set to null.
  If the motion parameters, MP(RefBlk(SPi)) of the reference sub-block of SPi is available,
   CMP(SPi) is set to MP(RefBlk(SPi));
   tempMP is set to MP(RefBlk(SPi));
   if CMP(SPi-1) is null, for each j=0,. . .,i−1:
    CMP(SPj) is set to tempMP .
  Else,
   If tempMP is not null, CMP(SPi) is set to tempMP.
 If tempMP is not null, the TIMVC of the current PU is marked as available.
 Else, the TIVMC of current PU is marked as unavailable.

The derived TIVMC or disparity inter-view Merge candidate (DIVMC) can be included in the Merge candidate list to improve coding efficiency for a 3D coding system. The Merge candidate list may include other Merge candidates such as one or more spatial Merge candidates and/or one or more temporal Merge candidates. The candidates in the candidate list usually are arranged in a special priority order for Merge candidate selection. In one embodiment, the TIVMC is placed at a leading position in the Merge candidate list. For example, a Merge candidate list may include ordered members {TIVMC, Left, Above, DIVMC, VSP, Left-bottom, Above-left, shifted TIVMC, shifted DIVMC and TMVP}, where Left, Above, Left-bottom, and Above-left correspond to spatial candidates at corresponding locations as implied by the names, TMVP corresponds to temporal candidate, and VSP corresponds to a candidate derived using view synthesis prediction. Shifted TIVMC and shifted DIVMC are resulted from adding an offset value to the respective TIVMC and DIVMC. The above list is intended to illustrate an example. The TIVMC may be placed at other position in the list. The candidate list may include different candidates as well.

In another example, if the reference sub-block of the current sub-PU is coded using disparity compensated prediction (DCP), the associated motion (i.e., disparity) parameter can be derived as the disparity inter-view Merge candidate (DIVMC) for current sub-PU to perform DCP, or the derived DV of the current sub-PU can also be directly used as DIVMC for the current sub-PU to perform DCP.

When the reference sub-block of the current sub-PU is coded using disparity compensated prediction (DCP), the current sub-PU assumes to have the same motion vector and POC (Picture Order Count) as the first reference sub-block. In other words, the current sub-PU uses the MV and POC of a corresponding reference sub-block coded in DCP. When the reference sub-block is coded DCP, the motion vector or disparity vector of the reference sub-block can be scaled according to view distance to generate the motion vector of the texture sub-PU corresponding to the reference sub-block. The MV (or DV) view-direction scaling techniques are known in the art and the details will not be repeated here.

The POC of the reference picture for a sub-PU may be different from the POC of the reference picture for the reference sub-block. In this case, the motion vector of the reference sub-block can be scaled according to POC distance to generate the motion vector of the texture sub-PU corresponding to the reference sub-block. The temporal MV scaling techniques are known in the art and the details will not be repeated here.

In another example, if the reference sub-block of a current sub-PU is Intra coded or DCP coded, the current sub-PU can use the motion parameter from the neighboring sub-PU or use the derived DV or a default motion parameter as the candidate motion parameter.

In another example, if the reference sub-block is MCP coded, the associated motion parameter is used as the TIVMC for the current sub-PU. If the reference sub-block is DCP coded, the associated motion parameter is used as DIVMC for the current sub-PU. If the reference sub-block is Intra coded, the motion parameter from the neighboring sub-PUs or a default motion parameter can be used as the candidate motion parameter for the current sub-PU.

Another embodiment of the present invention uses multiple sub-PU based inter-view Merge candidates corresponding to different sub-PU sizes. The sub-PU size may be selected from one or more block sizes smaller than or equal to a PU size. For example, a PU may have a block size of 32×32. One inter-view Merge candidate may be determined from reference sub-blocks corresponding to 16×16 sub-PUs and another inter-view Merge candidate may be determined from reference block corresponding to the 32×32 PU (i.e., no partition). In another example, one inter-view Merge candidate may be determined from reference sub-blocks corresponding to 16×16 sub-PUs and another inter-view Merge candidate may be determined from reference sub-blocks corresponding to 8×8 sub-PUs.

The block size of sub-PU can be 4×4, 8×8, 16×16, other sizes, or the current PU size. If a PU is smaller than or equal to the sub-PU, then this PU will not be further divided.

Each sub-PU can have its own associated derived DV, or all the sub-PUs in the current PU can share one derived DV.

One or more syntax elements can be used to signal whether the current PU is further divided into sub-PUs or not, a partition level of texture sub-PU partition, a quadtree/split depth for the texture sub-PU partition, or to indicate the sub-PU size.

The syntax elements can be explicitly transmitted in the sequence, view, picture, or slice level, such as SPS (sequence parameter set), PPS (picture parameter set), VPS (video parameter set), APS (adaptation parameter set), or slice header. The information about whether the PU is further divided, a partition level of texture sub-PU partition, a quadtree/split depth for the texture sub-PU partition, or the sub-PU size can also be derived implicitly at the decoder side.

The above information can be derived implicitly at the decoder side according to mode selections, motion parameters of the neighboring PUs, or according to the motion parameters of the reference blocks of the sub-PUs.

A system incorporating sub-PU based inter-view Merge candidates is compared with a conventional system (3D-HEVC Test Model version 7.0r1 (HTM 7.0r1)) based on full PU. Tables 1, 2 and 3 illustrate the comparison results for sub-PU=4×4, 8×8 and 16×16. The performance comparison is based on different sets of test data listed in the first column. The BD-rate differences are shown for texture pictures in view 1 (video 1) and view 2 (video 2). A negative value in the BD-rate implies that the present invention has a better performance. As shown in Tables 1-3, the system incorporating an embodiment of the present invention shows substantial BD-rate reduction for view 1 and view 2, where the improvement is as high as 7% in average BD-rate for the 4×4 sub-PU. The BD-rate measure for the coded video PSNR with video bitrate, the coded video PSNR with total bitrate (texture bitrate and depth bitrate), and the synthesized video PSNR with total bitrate also show noticeable BD-rate reduction. The encoding time and rendering time are above same as the conventional system. However, the decoding timing is increased for all cases. For the 4×4 sub-PU, the decoding time is increased by 24.2%. However, for the 16×16 sub-PU, the decoding time is only increased by 3.9%. The performance comparisons are summarized in Table 4.

TABLE 1

|  | Video 0 | Video 1 | Video 2 | Video PSNR/ video bitrate | Video PSNR/ total bitrate | Synth PSNR/ total bitrate | Enc time | Dec time | Ren time |
| --- | --- | --- | --- | --- | --- | --- | --- | --- | --- |
| Balloons | 0.0% | −7.5% | −7.8% | −2.5% | −2.2% | −2.0% | 98.0% | 119.5% | 99.4% |
| Kendo | 0.0% | −4.3% | −4.7% | −1.3% | −1.0% | −0.8% | 99.8% | 126.6% | 99.4% |
| NewspaperCC | 0.0% | −4.4% | −3.6% | −1.3% | −1.1% | −1.3% | 99.7% | 119.4% | 102.4% |
| GhostTownFly | 0.0% | −13.7% | −14.0% | −2.7% | −2.5% | −2.2% | 99.2% | 125.0% | 99.4% |
| PoznanHall2 | 0.0% | −7.7% | −7.3% | −2.7% | −2.4% | −2.1% | 100.7% | 126.5% | 99.0% |
| PoznanStreet | 0.0% | −5.2% | −5.2% | −1.3% | −1.2% | −1.1% | 100.6% | 123.3% | 98.1% |
| UndoDancer | 0.0% | −6.3% | −6.3% | −1.5% | −1.4% | −1.3% | 100.8% | 128.8% | 98.5% |
| 1024 × 768 | 0.0% | −5.4% | −5.4% | −1.7% | −1.4% | −1.4% | 99.2% | 121.9% | 100.4% |
| 1920 × 1088 | 0.0% | −8.2% | −8.2% | −2.1% | −1.9% | −1.7% | 100.3% | 125.9% | 98.7% |
| average | 0.0% | −7.0% | −7.0% | −1.9% | −1.7% | −1.6% | 99.8% | 124.2% | 99.5% |

TABLE 2

|  | Video 0 | Video 1 | Video 2 | Video PSNR/ video bitrate | Video PSNR/ total bitrate | Synth PSNR/ total bitrate | Enc time | Dec time | Ren time |
| --- | --- | --- | --- | --- | --- | --- | --- | --- | --- |
| Balloons | 0.0% | −6.5% | −6.8% | −2.2% | −1.9% | −1.8% | 96.9% | 107.8% | 98.6% |
| Kendo | 0.0% | −3.9% | −4.2% | −1.2% | −0.9% | −0.8% | 99.0% | 107.3% | 99.6% |
| NewspaperCC | 0.0% | −4.0% | −3.4% | −1.2% | −1.0% | −0.8% | 99.2% | 105.0% | 99.4% |
| GhostTownFly | 0.0% | −12.0% | −12.7% | −2.4% | −2.2% | −2.0% | 98.1% | 105.6% | 100.4% |

TABLE 2-continued

| | Video 0 | Video 1 | Video 2 | Video PSNR/ video bitrate | Video PSNR/ total bitrate | Synth PSNR/ total bitrate | Enc time | Dec time | Ren time |
|---|---|---|---|---|---|---|---|---|---|
| PoznanHall2 | 0.0% | −7.1% | −7.0% | −2.6% | −2.2% | −2.1% | 99.3% | 105.4% | 100.2% |
| PoznanStreet | 0.0% | −4.7% | −4.6% | −1.1% | −1.1% | −1.0% | 99.9% | 110.0% | 98.1% |
| UndoDancer | 0.0% | −4.6% | −4.8% | −1.1% | −1.0% | −0.5% | 99.1% | 106.5% | 98.1% |
| 1024 × 768 | 0.0% | −4.8% | −4.8% | −1.5% | −1.3% | −1.1% | 98.4% | 106.7% | 99.2% |
| 1920 × 1088 | 0.0% | −7.1% | −7.3% | −1.8% | −1.6% | −1.4% | 99.1% | 106.9% | 99.2% |
| average | 0.0% | −6.1% | −6.2% | −1.7% | −1.5% | −1.3% | 98.8% | 106.8% | 99.2% |

TABLE 3

| | Video 0 | Video 1 | Video 2 | Video PSNR/ video bitrate | Video PSNR/ total bitrate | Synth PSNR/ total bitrate | Enc time | Dec time | Ren time |
|---|---|---|---|---|---|---|---|---|---|
| Balloons | 0.0% | −5.0% | −5.3% | −1.7% | −1.5% | −1.4% | 97.1% | 99.5% | 96.6% |
| Kendo | 0.0% | −2.7% | −2.9% | −0.8% | −0.6% | −0.5% | 99.2% | 100.3% | 99.1% |
| NewspaperCC | 0.0% | −2.2% | −2.0% | −0.7% | −0.6% | 0.0% | 99.6% | 104.5% | 100.5% |
| GhostTownFly | 0.0% | −8.5% | −9.4% | −1.7% | −1.6% | −1.5% | 98.7% | 108.0% | 101.5% |
| PoznanHall2 | 0.0% | −6.3% | −5.8% | −2.2% | −1.9% | −1.8% | 99.4% | 100.6% | 99.0% |
| PoznanStreet | 0.0% | −3.0% | −3.0% | −0.7% | −0.6% | −0.6% | 100.2% | 108.5% | 98.2% |
| UndoDancer | 0.0% | −2.8% | −2.9% | −0.6% | −0.6% | −0.6% | 99.9% | 105.7% | 95.9% |
| 1024 × 768 | 0.0% | −3.3% | −3.4% | −1.1% | −0.9% | −0.6% | 98.6% | 101.4% | 98.8% |
| 1920 × 1088 | 0.0% | −5.1% | −5.3% | −1.3% | −1.2% | −1.1% | 99.6% | 105.7% | 98.7% |
| average | 0.0% | −4.3% | −4.5% | −1.2% | −1.1% | −0.9% | 99.2% | 103.9% | 98.7% |

TABLE 4

| Sub-PU size | Video 0 | Video 1 | Video 2 | Video PSNR/ video bitrate | Video PSNR/ total bitrate | Synth PSNR/ total bitrate | Enc time | Dec time | Ren time |
|---|---|---|---|---|---|---|---|---|---|
| 4 × 4 | 0.0% | −7.0% | −7.0% | −1.9% | −1.7% | −1.6% | 99.8% | 124.2% | 99.5% |
| 8 × 8 | 0.0% | −6.1% | −6.2% | −1.7% | −1.5% | −1.3% | 98.8% | 106.8% | 99.2% |
| 16 × 16 | 0.0% | −4.3% | −4.5% | −1.2% | −1.1% | −0.9% | 99.2% | 103.9% | 98.7% |

Figure 3:
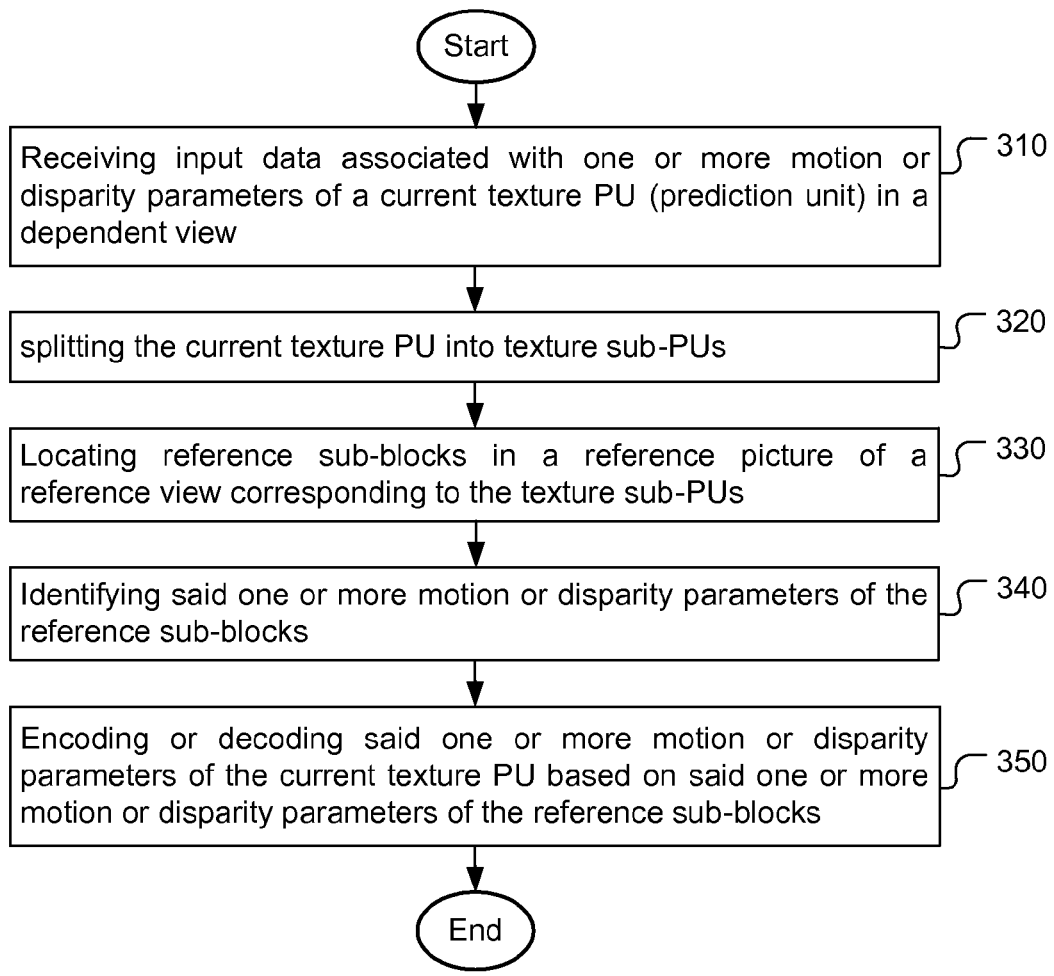
FIG. 3 illustrates an exemplary flowchart of sub-PU (prediction unit) based inter-view motion prediction (IVMP) for three-dimensional video coding according to an embodiment of the present invention.

FIG. 3 illustrates an exemplary flowchart of a three-dimensional encoding or decoding system incorporating sub-PU based inter-view motion prediction (IVMP) according to an embodiment of the present invention. The system receives input data associated with one or more motion or disparity parameters of a current texture PU (prediction unit) in a dependent view in step 310. For encoding, the input data corresponds to the motion or disparity parameters to be encoded. For decoding, the input data corresponds to coded motion or disparity parameters to be decoded. The input data may be retrieved from memory (e.g., computer memory, buffer (RAM or DRAM) or other media) or from a processor. The current texture PU is split into texture sub-PUs as shown in step 320. Reference sub-blocks in a reference picture of a reference view corresponding to the texture sub-PUs are located as shown in step 330. The motion or disparity parameters of the reference sub-blocks are identified as shown in step 340. The motion or disparity parameters of the current texture PU are encoded or decoded based on the motion or disparity parameters of the reference sub-blocks as shown in step 350.

The flowcharts shown above are intended to illustrate examples 3D or multi-view coding with sub-PU based inter-view motion prediction according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for three-dimensional or multi-view video encoding or decoding, the method comprising:
    receiving input data associated with one or more motion or disparity parameters of a current texture prediction unit (PU) in a dependent view;
    splitting the current texture PU into texture sub-PUs;
    adding a corresponding disparity vector (DV) to a location of each one of the texture sub-PUs;
    determining a reference location in a reference picture of a reference view based on a result of adding the corresponding DV to the location of each one of the texture sub-PUs;
    locating reference sub-blocks in the reference picture of the reference view corresponding to the texture sub-PUs based on the plurality of reference locations;
    identifying said one or more motion or disparity parameters of the reference sub-blocks; and
    encoding or decoding said one or more motion or disparity parameters of the current texture PU based on said one or more motion or disparity parameters of the reference sub-blocks.

2. The method of claim 1, wherein the corresponding DV is added to a middle location of each texture sub-PU to locate each reference sub-block.

3. The method of claim 1, wherein a first texture sub-PU shares the motion or disparity parameters of a neighboring sub-PU when the motion or disparity parameters of the reference sub-block corresponding to the first texture sub-PU are not available.

4. The method of claim 1, wherein a first texture sub-PU uses default motion or disparity parameters when the motion or disparity parameters of the reference sub-block corresponding to the first texture sub-PU are not available.

5. The method of claim 1, wherein if a first reference sub-block is a motion compensated prediction (MCP) block, the motion or disparity parameters of the first reference sub-block are used as candidate motion parameters in a temporal direction for the texture sub-PU corresponding to the first reference sub-block; and otherwise when the first reference sub-block is a disparity compensated prediction (DCP) block, the motion or disparity parameters of the first reference sub-block are used as candidate disparity parameters in an inter-view direction for the texture sub-PU corresponding to the first reference sub-block.

6. The method of claim 1, wherein when a first reference sub-block is a motion compensated prediction block, the texture sub-PU corresponding to the first reference sub-block is assigned a same motion vector and picture order count (POC) of the first reference sub-block.

7. The method of claim 1, wherein when the reference picture is in an inter-view direction, a motion vector or disparity vector of a first reference sub-block is scaled to generate the motion vector or disparity vector of the texture sub-PU corresponding to the first reference sub-block.

8. The method of claim 1, wherein a motion vector of a first reference sub-block is scaled to generate the motion vector or disparity vector of the texture sub-PU corresponding to the first reference sub-block when picture order count (POC) of a first reference picture for the first reference sub-block is different from the POC of a second reference picture for the texture sub-PU.

9. The method of claim 1, wherein an individual DV or a unified DV is used to locate each reference sub-block corresponding to each texture sub-PU.

10. The method of claim 9, wherein the unified DV is signaled explicitly to a decoder or is derived implicitly by the decoder.

11. The method of claim 9, wherein the unified derived DV is selected from a plurality of DV candidates and DV selection information is signaled explicitly to a decoder or is derived implicitly by the decoder.

12. The method of claim 1, wherein candidate motion or disparity parameters for the current texture PU comprise one or more candidate motion or disparity parameters derived for at least one texture sub-PU from splitting the current texture PU.

13. The method claim 12, wherein the candidate motion or disparity parameters for the current texture PU are used as a sub-block-based inter-view Merge candidate for the current texture PU in Merge mode.

14. The method claim 13, wherein the sub-block-based inter-view merge candidate is inserted into a first position of a candidate list.

15. The method claim 13, wherein the current texture PU has more than one sub-block-based inter-view merge candidates corresponding to different sub-PU sizes, and each sub-PU size includes one or more block sizes smaller than or equal to a PU size.

16. The method of claim 1, wherein texture sub-PU size is selected from a group.

17. The method claim 16, wherein the current texture PU is not further divided when the texture sub-PU size is larger than or equal to the current texture PU size.

18. The method claim 16, wherein a flag is signaled to indicate the texture sub-PU size, a partition level of texture sub-PU partition, a quadtree/split depth for the texture sub-PU partition, or whether the current texture PU is divided into the texture sub-PUs.

19. The method claim 18, wherein the flag is explicitly transmitted in a sequence level, view level, picture level, or slice level of a bitstream, or the flag is implicitly derived on decoder side.

20. The method claim 19, wherein the flag is implicitly derived according to mode selections, the motion parameters of one or more neighboring PUs, or according to the motion parameters of the reference sub-blocks of the sub-PUs.

* * * * *